J. I. MELLON.
AIR INLET FOR MAIN HOUSE TRAPS.
APPLICATION FILED AUG. 8, 1919.
1,371,568. Patented Mar. 15, 1921.
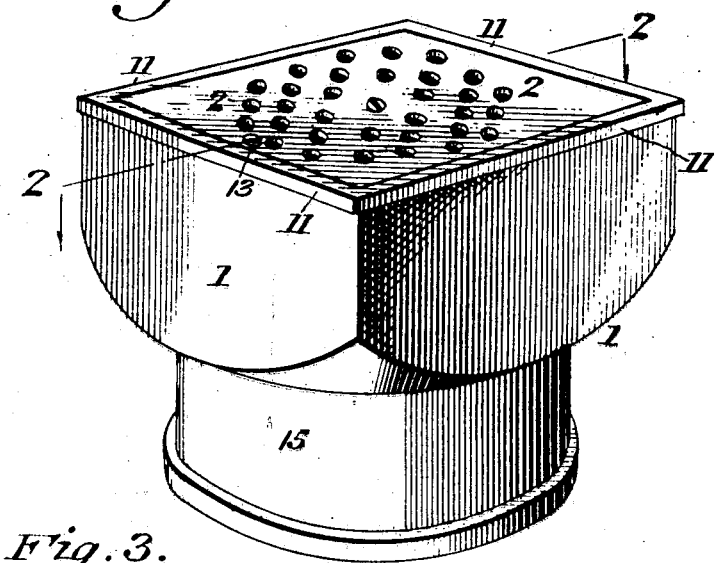
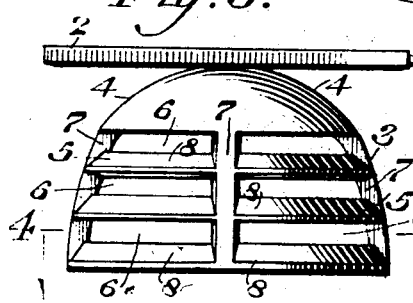
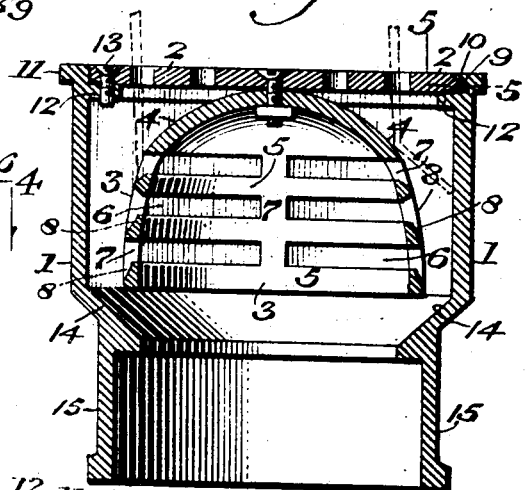
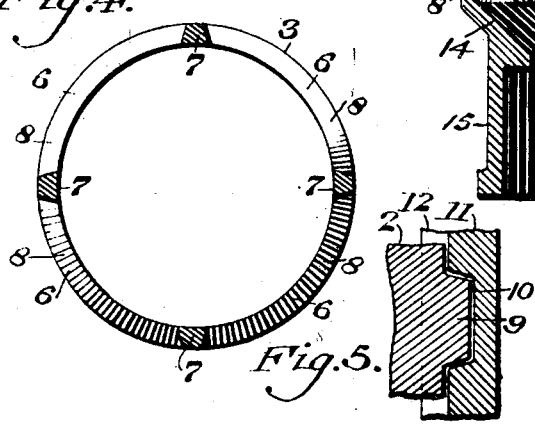

UNITED STATES PATENT OFFICE.

JAMES I. MELLON, OF PHILADELPHIA, PENNSYLVANIA, ASSIGNOR TO J. D. JOHNSON CO. INC., OF PHILADELPHIA, PENNSYLVANIA, A CORPORATION OF DELAWARE.

AIR-INLET FOR MAIN HOUSE-TRAPS.

1,371,568.  Specification of Letters Patent.  Patented Mar. 15, 1921.

Application filed August 8, 1919. Serial No. 316,040.

*To all whom it may concern:*

Be it known that I, JAMES I. MELLON, a citizen of the United States, residing in the city and county of Philadelphia, State of Pennsylvania, have invented a new and useful Air-Inlet for Main House-Traps of which the following is a specification.

My invention consists of an air inlet for a main house trap which is provided with a fender therein adapted to intercept sticks, twigs, or other like articles, especially those of some length, in such manner that they may be prevented from passing through the inlet and are so restrained that their upper ends are accessible so as to be grasped, and the sticks, etc., may be drawn outwardly through the cover of the box of the trap.

The invention is satisfactorily illustrated in the accompanying drawing, but the important instrumentalities thereof may be varied, and so it is to be understood that the invention is not limited to the specific details shown and described, as long as they are within the spirit or scope of the claim.

Figure 1 represents a perspective view of an air inlet embodying my invention.

Fig. 2 represents a central vertical section thereof on line 2—2 Fig. 1.

Fig. 3 represents a side elevation of the covering plate of the inlet and the fender therein.

Fig. 4 represents a horizontal section on line 4—4 Fig. 3.

Fig. 5 represents a horizontal section of a portion on line 5—5 Fig. 2, on an enlarged scale.

Similar numerals of reference indicate corresponding parts in the figures.

Referring to the drawings, 1 designates the box of an air inlet for a mainhouse trap, and 2 designates the perforated cover thereof, which excepting the features of my invention applied thereto are of usual construction.

Connected with and depending from said cover and occupying a position within said box is the fender 3 which is formed of the top dome 4, and the horizontal ring-like bars 5 which comprise the side of said fender, they increasing in diameter from top to bottom and being apart forming between the same the passages 6 for air.

The bars are connected with the dome by means of the vertical ribs 7 which are cast with said bars and dome forming a strong structure which is preferably that of a hemispherical body, said bars comprising the side of said body and having their upper faces beveled or sloping as at 8 and exposed forming stops to the descent of sticks, twigs, etc., through the box, as will be hereinafter more fully described.

The fender is connected to the cover by a screw and nut, as shown in Fig. 2, but other means may be employed for the same purpose. The cover is removably secured to the rim of the box by the tongue 9 on an outer side thereof, the same being adapted to enter the recess 10 in the inner side of the rim 11 of the box, said cover being seated on the shoulder 12 on the inner side of the top of the box below said rim 11, and attached thereto by the screw 13 which passes through the side portion of the cover into said shoulder and engages with the latter.

The inner side of the base of the neck of the box below the bottom of the fender is deflected inwardly forming the sloping shoulder 14 which extends somewhat under the outer wall of the body of the fender without preventing the passage of air through the box into the neck 15 thereof, and thence into a house for ventilation purposes.

It will be seen that air enters the box through the perforations of the cover as usual in such cases, but should sticks, or objects of similar nature of certain lengths enter said perforations their lower ends will strike and be stopped by the upper faces of the bars 5 and lodge thereon, or they may be deflected laterally therefrom toward the sides of the box, and so the sticks, etc., may in a measure be bent, and the lower ends rest against said sides, or the sticks, etc., may drop somewhat, whereby their lower ends may reach the upper sides of the shoulders 14 and lodge thereon, the sticks, etc., being further bent whereby they will be restrained effectively from descent into the neck of the box, it being noticed that the upper portions of the sticks, etc., are in the perforations of the cover 2 and remain therein frictionally in contact with the walls of said perforations, and so the sticks, etc., mainly entrained in the box on the fender have their upper ends within reach whereby they may be grasped and thereby withdrawn from the box and cover.

The dome or top of the fender being closed will prevent the sticks, etc., from entering the fender and flowing through the same, but should they pass through the cover and lodge on said dome they will be held therein and so prevented from dropping.

Having thus described my invention what I claim as new and desire to secure by Letters Patent, is:—

In an air inlet, a box having a perforated cover and a neck, a sloping shoulder on the inner side of the base of the latter, and a dome-shaped fender pendent from and secured to said cover in the form of a hollow body of separated ring-like bars with its lower end disposed above said shoulder, said bars increasing in diameter from the top to the bottom and having their upper faces beveled downward and outward.

JAMES I. MELLON.

Witnesses:—
JOHN A. WEIDERSHEIM,
N. BUSSINGER.